United States Patent [19]

Rudwick

[11] 4,280,581

[45] Jul. 28, 1981

[54] MOTOR AND PEDAL DRIVEN BICYCLES

[76] Inventor: Lawrence A. Rudwick, 3200 Glenwood Pl., Falls Church, Va. 22041

[21] Appl. No.: 905,531

[22] Filed: May 12, 1978

[51] Int. Cl.³ .................. B60K 1/00; B62K 11/04; B62M 7/06

[52] U.S. Cl. ................... 180/207; 180/205; 180/216; 180/220; 280/281 R

[58] Field of Search ............ 180/33 C, 33 R, 33 E, 180/34, 35, 65 A, 207, 205, 220, 216, 68.5, 222; 280/230, 231, 281 R

[56] References Cited

U.S. PATENT DOCUMENTS

| | | |
|---|---|---|
| 2,331,976 | 10/1943 | Hare ................................. 180/33 D |
| 2,457,430 | 12/1948 | Argyris ............................. 180/33 R |
| 2,491,076 | 12/1949 | Benazzoli ......................... 180/205 |
| 3,891,044 | 6/1975 | Tiede ................................ 180/33 D |
| 3,905,442 | 9/1975 | O'Neill, Jr. ..................... 180/33 D |
| 3,912,039 | 10/1975 | Ordemann ....................... 180/33 C |
| 3,915,250 | 10/1975 | Laden et al. ..................... 180/33 D |
| 3,921,741 | 11/1975 | Garfinkle et al. ................ 180/34 |
| 3,961,678 | 6/1976 | Hirano et al. ................... 180/33 C |
| 3,991,843 | 11/1976 | Davidson ......................... 180/33 C |
| 4,072,204 | 2/1978 | Leighton et al. ................ 180/34 |

*Primary Examiner*—Randolph A. Reese
*Assistant Examiner*—Donn McGiehan
*Attorney, Agent, or Firm*—Howard L. Rose

[57] ABSTRACT

An electrically assisted bicycle is disclosed, including a modified elongated frame, such that the storage battery and motor may be mounted at a low level between the pedals and the rear wheel for a more stable and smooth ride and to lessen the likelihood of wheel hop, and to make the vehicle easier to hold upright at rest. The motor and pedals are efficiently coupled so that either or both simultaneously may power the driven wheel; and either power source can remain stationary, causing no drag, while the other propels the vehicle.

13 Claims, 4 Drawing Figures

MOTOR AND PEDAL DRIVEN BICYCLES

BRIEF DESCRIPTION OF PRIOR ART

The present invention relates to electrically powered bicycles and more particularly to a bicycle that can be driven by either or simultaneously by an electric motor or a rider via conventional pedals.

Electrically assisted bicycles are well known in the prior art, as evidenced, for example, by the patents of O'Neill U.S. Pat. No. 3,905,442, Garfinkle U.S. Pat. No. 3,921,741, Davidson U.S. Pat. No. 3,991,843, Ordemann U.S. Pat. No. 3,912,039, Tiede U.S. Pat. No. 3,891,044, and Laden U.S. Pat. No. 3,915,250. In these patents, when modifying a standard bicycle to electric assisted power (adding a storage battery and an electric direct current motor), inherent difficulties exist in providing such with a desirable and adequate combination of weight balance, power, top speed, ease of operation, and range (distance between rechargings).

One of the primary concerns must be to allow for an adequately size storage battery. Unfortunately, standard bicycle frames are not designed to support storage batteries. Nevertheless, much of the prior art illustrates electrically assisted bicycles having their batteries mounted under the top tube, above the pedals. When mounted here, the width of the battery is severely limited as one's thighs normally remain close together while pedalling. Applicant's battery straddles the riders feet while pedalling. The distance between one's feet while pedalling, being much greater than the distance between one's thighs, allows room for a much wider battery, one which can store more energy.

Other electrically assisted bicycles have their batteries mounted over the rear wheel. This causes poor handling ability during all types of maneuvers, and being positioned where a bicycle luggage rack or saddle bag are normally attached, limits the ability to carry objects.

Due to the limited energy capability of the common storage battery, it is very important for a vehicle of this nature to be highly electrically and mechanically efficient, for maximum cruising range. Furthermore, the motor should be able to efficiently supply power for starting the vehicle moving, and all operations involved in riding the vehicle should be similar and not significantly more complicated than riding modern multi-speed bicycles. Conventional friction drive electrically assisted bicycles are often more difficult to pedal up moderate to steep hills than equivalent bicycles without the motor and battery because their added weight more than negates the minimal horsepower output of the motor when the motor turns very slowly; the major flaw with single gear ratio systems is that a compromise must be reached between hill climbing power and top speed.

Variable ratio friction drive systems are in the prior art. The difficulty here lies in the fact that the rider must not only shift its normal bicycle gears (much greater than half of today's bicycles are multi-speed), one must also be concerned with shifting a totally separate gear changing system to insure that the motor is turning at an efficient rate of speed. Furthermore, it is quite difficult to tell when the motor is, in fact, operating at an optimal speed, as electric motors are extremely quiet. With an infinitely variable ratio friction drive system, a current motor is required and should be continually monitored by the rider.

In summary, all of the known patents have one or more of the following disadvantages: poor balance due to high center of gravity of the storage battery and motor, poor range, due to inefficient drive systems and/or lack of gear ratio changing of the motor, poor range due to the limited size battery the bicycle can accomodate, accelerated tire wear caused by the friction drive system, battery in the way of rider legs and thighs, complicated electrical or mechanical motor speed control, the inability to use the motor from rest, uncomfortable ride during relatively high speed on irregular roads, motors which slow you down when travelling faster than a certain speed, overloaded tires, wheels, frame and/or brakes (due to using a bicycle not intended for the additional weight and/or speed), poor hill climbing ability, and low top speed. It will be shown that the disclosed invention has none of the above drawbacks.

SUMMARY OF THE INVENTION

In order to avoid the above and other drawbacks of the known electrically assisted bicycles, the vehicle of the present invention was developed including an improved elongated frame design compatible with improved mounting positions for the battery and the motor arranged at a relatively low and unobstructing location on the vehicle frame rearward of the pedals and forward of the rear wheel, thereby permitting excellent weight balance between the front and rear wheel, a low center of gravity, and little weight transfer during hard braking. Specifically, the frame is elongated so that the frame member extending between sprocket wheel hub and the lower, rear wheel yoke is sufficiently long to support on its upper surface a relatively large lead-acid (or other suitable) storage battery such as the Sears "Die Hard" and support from its lower surface an electric motor having its drive shaft generally parallel to the elongated member. In order to permit drive by the motor and/or the cyclist, a durable sprocket and multiple one-way clutching arrangement is provided; one sprocket being driven by the chain from the sprocket wheel and the other sprocket being driven by the motor and/or the other sprocket; the latter sprocket driving a chain to the rear wheel. An electrically assisted bicycle according to the present invention, uses a conventional battery and motor to permit bicycles to travel faster and further than conventional electric bicycles. The average 150 pound person can deliver 1/10 horsepower on a steady basis, enough to travel 15 miles per hour on level ground on a 50 pound bicycle. The weight to power ratio is therefore 2000 pounds per horsepower. A 40 pound lead acid automobile storage battery can deliver 25 amperes at 12 volts, or 300 watts for 120 minutes. Three Hundred watts is what a motor will draw when producing 0.3 horsepower at 75% efficiency. Operating totally from the battery and motor, the above bicycle, rider, battery and motor will produce 0.3 horsepower, weight 250 pounds, yielding a weight to power ratio of only 833 pounds per horsepower. The vehicle travels approximately 20 miles per hour for 2 hours. When the rider supplies additional power, the situation improves further still. If the rider delivers 1/10 horsepower, the horsepower now becomes 0.4 horsepower; the vehicle will travel 53 miles on a single charge. The weight to horsepower ratio is now reduced to 625 pounds per horsepower.

To transmit power efficiently to the rear tire of the vehicle from both power sources, the human rider and the storage battery, the gear ratios must be such that the rider's legs and the electric motor may rotate at speeds that are mechanically efficient on a power basis. For an average person, one's feet should turn between approximately 60 and 100 revolutions per minute. When pedalling hard but too slowly, excessive strain is put on one's knees and muscles, and one is apt to quickly overheat. When pedalling too fast, it is difficult for each stroke to produce much force.

Similarly, an electric permanent magnet motor is designed to operate within a limited RPM range. Its normal operating range is typically between 75% and 100% of its maximum, or no-load RPM, yielding motor efficiencies between approximately 60% to 85%. When connected directly to a storage battery, as the RPM's decrease, current drawn by the motor increases steadily. If the motor is forced to drop to say, 20% of its no-load speed, which is a likely occurance when climbing a moderate hill with a single speed friction drive assist unit on a bicycle, the motor power output is very low, yet the current drawn is enormous, yielding a motor efficiency of approximately 18%. A motor operating under this condition can quickly overheat and burnout. Furthermore, storage batteries operate best when discharged slowly. One which will completely discharge in 120 minutes at 25 amps will completely discharge in far less than 60 minutes at 50 amps. Therefore, it is very undesirable to operate the motor too slowly. Consequently, a gear reducer is introduced between the motor and the drive of the second sprocket of the group of two sprockets whereby the second sprocket is rotated at the same RPM's as by the rider operating at maximum efficiency. The bicycle is provided with gear changing mechanisms so that the motor and rider can maintain proper rotational speed regardless of load.

As previously indicated drive means are provided such that power is transmitted to the rear wheel of the vehicle via the pedals and/or the direct-current motor. The vehicle can easily be pedalled and operated like an ordinary bicycle. Under this mode, an overrunning clutch (or other freewheeling device) allows the rear wheel to be powered by the pedals and the motor is not forced to turn.

Alternately, the motor, controlled by an on-off switch, can power the vehicle. A second freewheeling mechanism allows the pedals to remain stationary under this second mode.

Under a third mode, both the motor and pedals may turn simultaneously. This mode is beneficial to obtain an increase in speed, acceleration, more power for hill climbing, and to extend the range of the vehicle.

In addition, when a coasting effect is desired (such as when riding down a gentle grade), the motor may be shut off and the pedals need not rotate.

The use of a multi-speed rear hub assembly, such as a hub utilizing an ordinary multi-sprocketed bicycle free wheel or other gear changing means, in conjunction with said pedal/motor combination which will be more fully described, allows the rider to change the gear ratios of the pedals and motor (with respect to the rear wheel) simultaneously, since the pedals and motor transmit power through a common transmission, to meet varying travel conditions.

The direct-current motor used to power said vehicle is preferably of the permanent magnet type, being high in efficiency and inexpensive to manufacture. Furthermore, to achieve a high power to weight ratio, and be compact, the motor should preferably have a normal operating speed of at least 2000 RPM or greater. Gear reduction means are therefore necessary as a 24" diameter driven wheel travelling at 30 MPH will be turning less than 500 RPM.

A conventional gear reduced motor of sufficient power (one with maximum power between approximately 1/5 to 1 horsepower) cannot easily be positioned such that the rotational axis of the motor armature extends transversely along the bicycle frame, just rearward of the pedals, as pedal/foot clearance becomes a problem. Therefore, a right angle gear reducer is employed and the output shaft axis of the motor is straddled by the rider's feet.

Accordingly, the primary object of the invention is to provide a battery powered electric assisted bicycle which is easy to balance, operates like and requires the same skills to ride as an ordinary bicycle, allows the rider to travel faster and with less pedalling effort under all normal riding conditions over a relatively long range of charge, compared to a similar quality non-electric bicycle, is mechanically and electrically efficient, allowing the motor to operate within its efficient range virtually all the time.

A more specific object is to provide a battery powered electrically assisted bicycle whose frame can support a storage battery and a motor such that the center of gravity is kept low, and the battery and motor does not interfere with normal bicycle operation.

Another object of the present invention is to provide a vehicle whose wheelbase is longer than an ordinary bicycle, which can accomodate a battery mounted between the rear wheel and the pedals, allowing a smoother, more stable ride.

Still another object of the present invention is to provide a 2-wheeled vehicle which can be pedalled as an ordinary bicycle, powered by a motor without having to pedal, pedalled with the motor running for additional power, or coast, and be able to switch between these modes instantaneously.

Yet another object of the present invention is to provide a vehicle whose motor and pedals power a common transmission associated with the driven rear wheel.

It is another object of the present invention to provide a mechanical coupling system including a dual-freewheeling mechanism, a gear reducer, and sprockets such that the ratio between the motor and the pedals allow each to rotate within its respective efficient RPM range simultaneously.

Still another object of the present invention is to provide a compact, non-cumbersome drive system, utilizing 2 endless chains, such that the chains are less accessible to one's pant legs than ordinary bicycles without chain guards.

It is yet another object of the present invention to provide an electrically assisted bicycle which allows a single storge battery of sufficient capacity to propel said vehicle rather than two or more small batteries.

Another object of the present invention is to provide a drive system in which the motor does not hinder pedalling ability when the battery becomes discharged.

Yet another object of the present invention is to provide a bicycle frame which protects the battery if bicycle tips over.

Another object of the present invention is to provide a battery, motor configuration for driving a bicycle so that waste heat from the motor can be vented to the battery to improve battery efficiency during cold weather.

Yet another object of the present invention is to provide a motor driven bicycle in which no speed control is required other than an on-off switch.

Still another object of the present invention is to provide a motor driven bicycle in which no centrifugal clutch is needed.

Another object of the present invention is to provide a motor driven bicycle having a quiet, non-polluting power source which is over 50% efficient.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawing, wherein.

Figure 1:
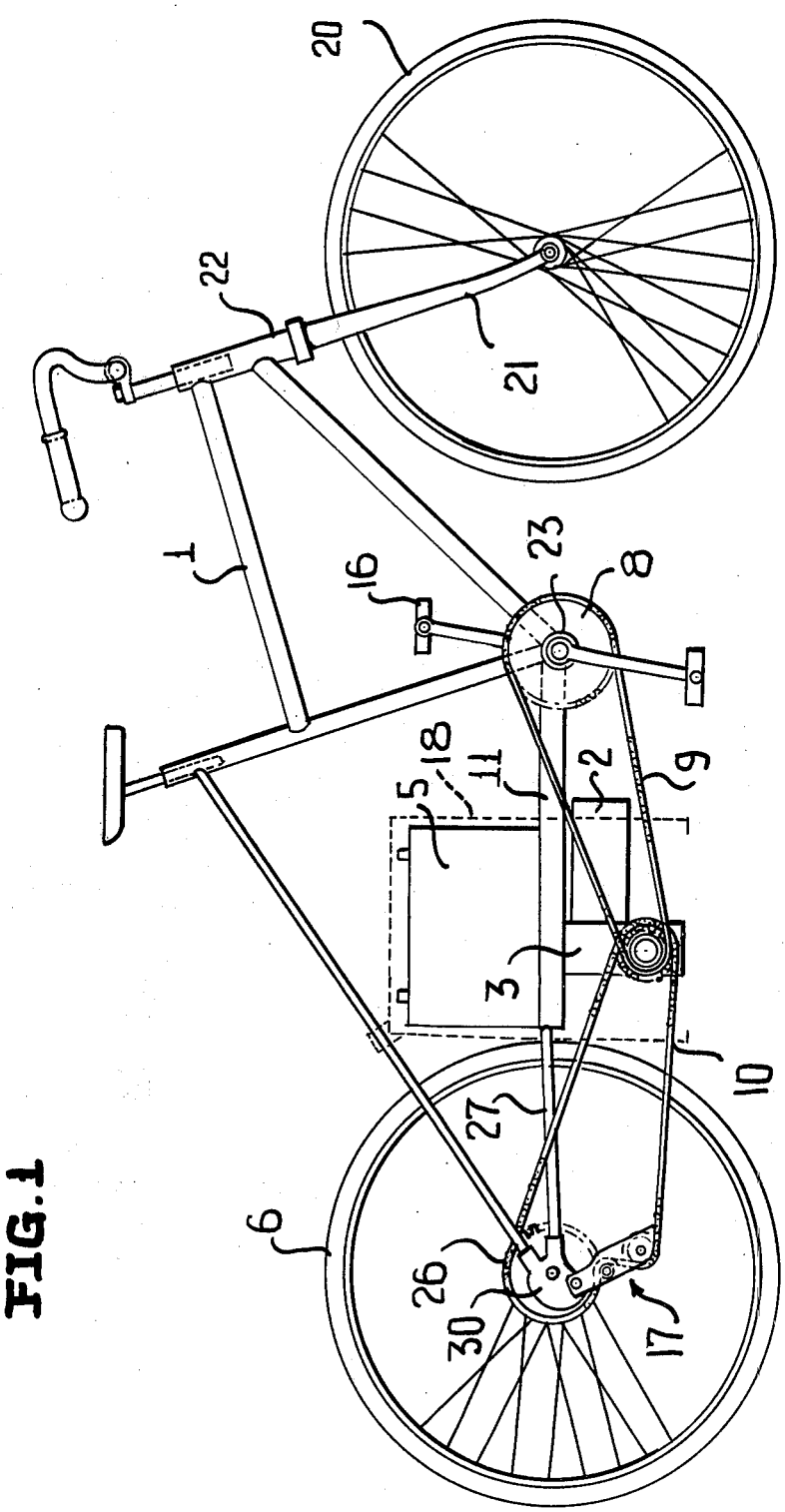
FIG. 1 is a view in elevation of the bicycle of the present invention.

Referring now specifically to the accompanying drawings and more particularly in FIG. 1, the two-wheeled vehicle of the present invention comprises a tubular frame 1, whose forward section, including front wheel 20, front fork 21, head tube 22, and steering apparatus, is similar or identical to an ordinary bicycle or motorcycle, whose crank axle and pedals 16 are situated rearward of the front wheel similar to a bicycle, whose seat is located above and rearward of bottom bracket 23 and at normal spacing rearward of the handlebar and a rear wheel 6. The rear wheel 6 is located a relatively great distance rearward of the bottom bracket 23 compared with conventional bicycles. Between the bottom bracket 23 and rear wheel 6, a storage battery 5 is mounted above an elongated generally horizontal member 11, such that the pedals 16 are free to rotate and the center of gravity of the vehicle is kept low. Horseshoe shaped chain stay 27, mounts to the rear section of member 11, curves transversely rearwardly, wider than battery 5, to protect the battery against side impacts and against ground impacts. The rear portion of chain stay 27 is secured to the rear dropouts 30, which support the rear wheel hub.

A dc motor 2 is directly coupled to a right angle worm gear reducer 3, both of which are mounted beneath frame member 11. The motor and its output shaft (not illustrated) are oriented generally lengthwise with respect to the frame 1; the motor driving the gear reducer 3. The axis of output shaft 12 (see FIG. 3) of the gear reducer 3 is perpendicular to the plane containing the front chain wheel 8 (the sprocket associated with the front cranks), i.e. the plane of the bicycle frame 1.

A sprocket 15 is securred to shaft 12 via an overrunning clutch 13 or other free wheeling device such that shaft 12 can drive sprocket 15 but sprocket 15 cannot drive shaft 12. Sprocket 15 drives rear wheel sprocket 25 via the chain 10.

A second sprocket 14 is coupled to the outer shell of the clutch 13 via a second overrunning clutch 30 such that sprocket 14 can drive sprocket 15, but not vice versa. Sprocket 14 is driven from chain wheel 8 via chain 9.

In operation the pedals drive rear wheel 6 via chain 9, sprocket 14, clutch 30, sprocket 15, chain 10 and speed changing arrangement 17. The motor drives wheel 25 via gear reducer 3, shaft 12, clutch 13, sprocket 15, etc. With shafts 12 and sprocket 14 both turning at the same RPM both drive the sprocket 15.

When the motor is turned on, output shaft 12 turns, powering sprocket 15. With the motor on, the rider may pedal, causing sprocket 14 to turn. Alternatively, the rider may allow the motor to supply all the power, sprocket 14 not turning, but freewheeling with the output shaft 12 and overrunning clutch 13 turning from within. All power, therefore, is ultimately transmitted to the rear wheel hub via sprocket 15.

In the preferred embodiment, to have control of the pedal speed, and motor speed (therefore motor power output) a gear changing mechanism 17 is associated with the rear hub. This may include a multiple sprocket rear wheel cluster 26, gears mounted inside the rear wheel hub, or other types of gear changing transmissions now ordinarily found on bicycles. The transmission may be manually shifted by the operator, or may be automatically shifted. There may be a set number of possible gear ratios available, or an infinitely variable transmission may be employed.

Figure 3:
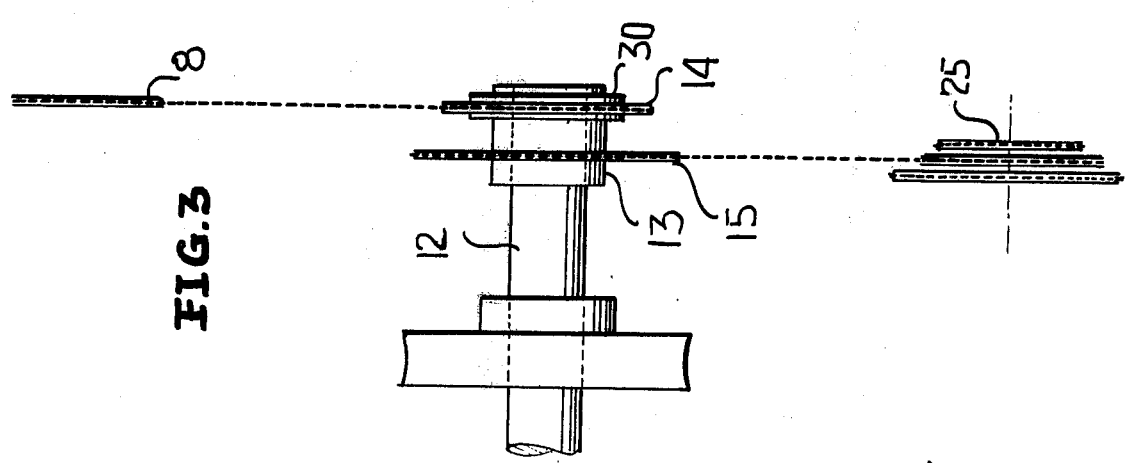
FIG. 3 is a diagramatic view of the drive train employed in the invention.
Figure 2:
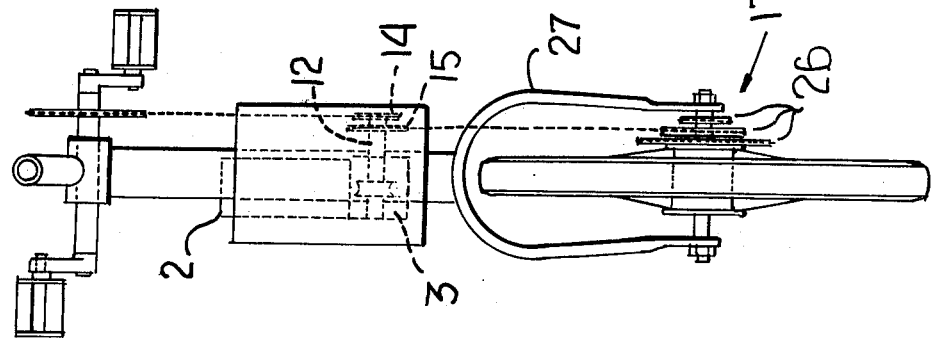
FIG. 2 is a top view of the bicycle of the present invention.

Referring to FIG. 3, a proper combination of motor gear reducer ratio and the ratio between the size of the chain wheel 8 and sprocket 14 allow the motor and pedals to power sprocket 15 at their respective optimum RPM range simultaneously. If, for example, the gear reducer ratio were 10:1, and chain wheel 8 had a diameter 3 times that of sprocket 14, the motor 2 should rotate 30 times faster than the chain wheel, when both are simultaneously powering the vehicle. The motor to chain wheel ratio should be set so the motor rotates in its intended range when the rider pedals at his preferred cadence. Both power sources may be operated concurrently and efficiently by quantitatively shifting gears according to road speed, or qualitatively by shifting according to pedalling speed.

The preferred embodiment is operated similarly to an ordinary bicycle. Starting should be in low gear, and then shifted to the gear that allows power to be applied to the vehicle efficiently. The proper gear for the motor is readily determined by the user simply by choosing the gear in which such person can pedal comfortably without motor assist. Then the motor can be energized by simply operating an on-off switch. In this manner the motor and thus the entire electrical drive system may always be operated at maximum efficiency. Power may be supplied by the motor 2 by activating an on-off switch. Power may be supplied by the rider via the pedals as an ordinary bicycle. Power may be supplied by the rider and motor simultaneously. Under this mode, the faster one pedals, the less power the motor is producing (the less the current draw as well). Therefore, the rider can pedal slowly, letting the motor do most of the work, or pedal faster and extend the range before recharging is required.

Speed is controlled by what gear is used, using the motor intermittently and how much one pedals. To travel slowly, using the motor, the rider would use low gear. The motor would rotate fast, producing little power and drawing little current. Slower speeds are achieved by using the motor less frequently, or by merely pedalling casually. The vehicle coasts better than a bicycle due to its increased weight and only minimal increase in wind resistance. Power may be shut off to coast at any time; the motor will not restrain the speed in any phase of operation.

Figure 4:
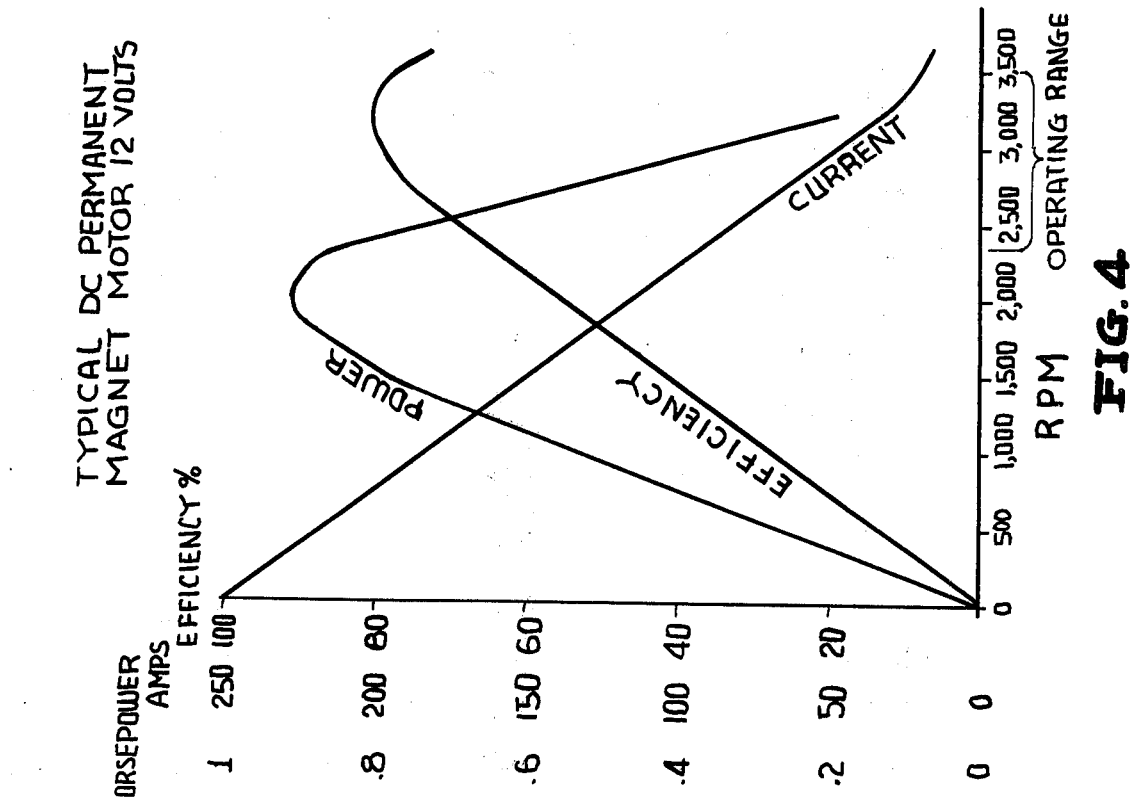
FIG. 4 is a multiple graph of the current, power, efficiency of a permanent magnetic dc motor employed.

Referring to FIG. 4 there is illustrated the various current, power and efficiency curves for a standard P.M. direct current motor. It is apparent that the proper operating range is, as indicated, in the 2300 to 3500 RPM range which as indicated is readily achieved at all speeds of the bicycle by means of the gear changing apparatus.

It is well known that conventional storage batteries lose considerable capacity in cold weather. Therefore, if waste heat from the motor and gear reducer could be transmitted to the battery, the range and energy costs would be improved in cold weather. The following calculations attempt to calculate temperature gains to the battery caused by waste heat:

Assumptions: Motor draws 25 amp average (at 12 volts)=300 watts Motor averages 55% efficiency, gear reducer 85% efficiency. Therefore, 46.45% overall efficiency, or 53.25% heat loss, or 159.75 watts. No thermal heat loss.

1 watt=3.413 BTU/hour—Therefore 160 watts=546 BTU/hour.

| | Materials to be Heated | | | | |
|---|---|---|---|---|---|
| | 45 lbs. Battery | | Motor | | Gear |
| Substance | 10# acid water | 30# lead | 5# plastic | 8# steel | reducer 4# steel |
| Specific (cal/g) Heat | 1 | .031 | .3 | .11 | .11 |
| Product (lbs. × Spef. Ht.) | 10 | .9 | 1.5 | .88 | .44 |

Total is equivalent to 14# of H$_2$O.
Therefore, in one hour Temp gain = 546/14 = 39° F.

In order to trap the heat generated by the motor, in cold weather a shroud is placed over the battery motor combination as indicated by dashed line 18 of FIG. 1.

It should be noted that many changes may be made in the specific parts utilized. Various different one way clutches may be employed. As more efficient batteries become available at reasonable prices the lead-acid battery may be replaced. Belts may be employed instead of chains. Of course, if for some reason the rider does not wish motor power for a specific run, the space vacated by the battery may be employed for storage.

The present invention forms the subject matter of Disclosure Document No. 057297 filed by the present inventor on Feb. 11, 1977.

While I have described and illustrated one specific embodiment of my invention, it will be clear that variations of the details of construction which are specifically illustrated and described may be resorted to without department from the true spirit and scope of the invention as defined in the appended claims.

I claim:

1. An electrically powered bicycle having a frame member including a generally conventional arrangement and dimensioning of a head tube, a front fork depending downward from the head tube, a bottom bracket for rotatably supporting a chain wheel with pedals coupled to the chain wheel, a seat support and frame members extending at least between the bottom bracket and the seat support and the bottom bracket and the head tube,
   a generally horizontal chain stay,
   a rear wheel,
   means for rotably supporting said rear wheel from said chain stay,
   an elongated generally horizontal frame member extending between said bottom bracket and said chain stay,
   a battery,
   means for supporting said battery on said elongated frame member,
   an electric motor,
   means for supporting said electric motor on said elongated frame member,
   a drive shaft,
   a first sprocket disposed about said drive shaft,
   means for driving said drive shaft from said electric motor,
   means for driving said rear wheel from said first sprocket, and
   means for driving said first sprocket only from said drive shaft, only from said pedals and concurrently from both said drive shaft and said pedals.

2. An electrically powered bicycle according to claim 1 further comprising
   speed reduction means disposed between said electric motor and said drive shaft,
   said speed reduction means having a speed reduction ratio whereby said sprocket is driven by said electric motor at the same number of revolutions per minute as by said pedals at normal peddling speeds.

3. An electrically powered bicycle according to claim 1 or claim 2 further comprising
   a second sprocket
   means for driving said second sprocket from said chain wheel,
   free wheeling means for driving said first sprocket from said second sprocket only when said second sprocket is turning at the same speed as said first sprocket,
   free wheeling means for driving said first sprocket from said drive shaft only when said shaft is rotating at the same speed as said first sprocket.

4. An electrically powered bicycle according to claim 2 wherein said electric motor is a permanent magnet, direct current motor.

5. An electrically powered bicycle according to claim 4 further comprising speed changing means having an input drive and an output drive and means for changing the ratio of input drive to output drive rates of rotation, said means for driving said rear wheel including said speed changing means.

6. An electrically powered bicycle according to claim 1 further comprising a heat shield,
   said heat shield being removably disposable over said battery and said motor whereby to heat said battery in cold weather.

7. An electrically powered bicycle according to claim 1 wherein said chain stay is flared horizontally outward transverse to said frame to locations wider than said battery.

8. An electrically powered vehicle also having pedal drive and including a conventional bottom bracket,
   a generally horizontal chain stay,
   a rear wheel,
   means for rotably supporting said rear wheel from said chain stay, an elongated generally horizontal frame member extending between said bottom bracket and said chain stay,
a battery,
means for supporting said battery on said elongated frame member,
an electric motor
means for supporting said electric motor on said elongated frame member,
a drive shaft,
a first sprocket disposed about said drive shaft,
means for driving said drive shaft from said electric motor,
means for driving said rear wheel from said sprocket, and
means for driving said first sprocket only from said drive shaft, only from said pedals and concurrently at all speeds from both said drive shaft and said pedals.

9. The combination according to claim 8 wherein said battery is disposed above and on said elongated frame member, and
wherein said electric motor is disposed below said elongated frame member generally under said battery.

10. An electrically powered bicycle having a frame member including a generally conventional arrangement and dimensioning of a head tube, a front fork depending downward from the head tube, a bottom bracket for rotatably supporting a chain wheel with pedals secured to the chain wheel, a seat support and frame members extending at least between the bottom bracket and the seat support and the bottom bracket and the head tube,
a generally horizontal chain stay,
a rear wheel,
means for rotatably supporting said rear wheel from said chain stay,
an elongated generally horizontal frame member extending between said bottom bracket and said chain stay,
a battery,
means for supporting said battery on and above said elongated frame member,
an electric motor having a drive shaft,
means for supporting said electric motor on and below said elongated frame member,
a chain drive for said rear wheel, and
means for driving said chain drive only from said drive shaft, only from said pedals and concurrently over all operating speeds from both said drive shaft and said pedals.

11. An electrically powered bicycle according to claim 10 wherein said means for driving comprises
a speed reducing means driven by said motor,
a free wheeling device driven by said speed reducing means,
a second free wheeling means driven by said pedals, and
means connecting said free wheeling means such that each drives said chain drive only.

12. An electrically powered bicycle according to claim 11 having means for reducing motor speed such that said motor and said pedals drive said chain drive at the same speed in the range of normal pedalling speeds of a cyclist,
said means for reducing including said speed reducing means.

13. An electrically powered bicycle according to claim 12 wherein said motor is a permanent magnet motor operating efficiently between 2300 RPM to 3500 RPM and wherein said speed reduction is in the range of approximately 30:1 to 35:1.

* * * * *